United States Patent [19]

Hayden

[11] Patent Number: 4,738,328
[45] Date of Patent: Apr. 19, 1988

[54] HOUSING FOR A RIDING LAWNMOWER TRANSMISSION

[75] Inventor: Ronald G. Hayden, Bainbridge, Ind.
[73] Assignee: Bryant-Poff, Inc., Coatesville, Ind.
[21] Appl. No.: 592
[22] Filed: Jan. 6, 1987
[51] Int. Cl.[4] .............................................. B60K 17/00
[52] U.S. Cl. ................................... 180/70.1; 180/312
[58] Field of Search ...................... 180/6.48, 70.1, 72, 180/294, 312

[56] References Cited

U.S. PATENT DOCUMENTS

| 2,436,757 | 2/1948 | Lewis | 180/294 |
| 3,403,746 | 10/1968 | Fox et al. | 180/70.1 |
| 4,132,278 | 1/1979 | Todeschini | 180/6.48 |

OTHER PUBLICATIONS

Dixie Chopper Owner's Manual & Parts List for Model 5018–pp. 9, 11 & 18.
Dixie Chopper Parts & Service Manual for Model 5018 Magnum–pp. 8, 10, 12, 16, 18, 30 & 34.

*Primary Examiner*—Ross Weaver
*Attorney, Agent, or Firm*—Woodard, Emhardt, Naughton, Moriarty & McNett

[57] ABSTRACT

A riding lawnmower transmission housing assembled from four unitary sheet metal parts including a floor, a central engine plate, a first J-shaped plate, and a second J-shaped plate. The housing's manufacture and assembly is facilitated by its use of few parts which enhance adherence to design specifications and tolerances of the housing. The housing includes an engine wall which acts as thermal barrier, impeding heat transfer between the engine and the transmission. The transmission housing is slidably movable along slots, facilitating movement of the housing relative to the drive wheels, allowing drive chain adjustments and replacement.

13 Claims, 7 Drawing Sheets

HOUSING FOR A RIDING LAWNMOWER TRANSMISSION

BACKGROUND OF THE INVENTION

The present invention relates generally to the field of riding lawnmower power trains and more specifically to the field of housings used to mount a transmission in a power riding lawnmower.

Riding lawnmower transmission housings which are known to the inventor consist primarily of combining a multiplicity of separate parts by bolting, welding and similar means. Inherent in these housings is the serious problem of high labor cost incurred in manufacturing and assembling the various parts. Furthermore, manufacturing, inventory and handling costs are increased when a manufacturer of these housings must obtain, store and inventory the various parts.

Another significant problem associated with these designs is a lack of quality control. During assembly, it is not uncommon for component parts of a housing to be misaligned or insecurely fastened to the housing. As a result, time and resources are lost later in the assembly of the entire lawnmower when a defective lawnmower transmission housing is employed. Also, these other designs contribute to a lower quality finished mower.

Another limitation in the art of lawnmower transmission housings is the lack of any means to prevent the transmission and the engine from overheating. It is not uncommon for riding lawnmowers to have their engine located proximate to the transmission. Typically, such engines and transmissions have design temperatures, above which undue wear and deterioration occurs. Engine overheating is sometimes attributed to excess heat emanating from the transmission. Transmission overheating is sometimes attributed to excess heat emanating from the engine. Typically, these engines and transmissions are air cooled, and when located close to one another contribute to each others thermal deterioration.

Another limitation of prior devices is the ability to easily accommodate changing or adjusting a drive chain connecting the lawnmower wheels to the rest of the transmission. The prior devices which the inventor is aware of do not teach nor suggest a riding lawnmower housing which is easily movable relative to the lawnmower chassis and the wheels so as to allow easy repair or replacement of a drive chain.

An advantage of the present invention over earlier designs is that the present invention provides a lawnmower transmission housing with sufficient structural strength while comprising relatively few parts for manufacture, inventory and assembly. The present invention also provides a lawnmower transmission housing having high quality and conformity with design specifications. Another advantage of the present invention is that it provides a lawnmower transmission housing with means to reduce overheating of the riding lawnmower's engine and/or transmission by the use of a partition between the engine and transmission. Also, the present invention provides means to easily change and/or adjust a drive chain of a riding lawnmower transmission by allowing relative movement between the transmission housing and the drive wheel axle.

SUMMARY OF THE INVENTION

An improved housing for a riding lawnmower transmission according to one embodiment of the present invention comprises a pair of J-shaped folded plates, each including a side wall panel, an engine panel and an inner flange panel; a central engine plate disposed between the pair of J-shaped plates and rigidly attached to the J-shaped plates; a floor plate disposed beneath the pair of J-shaped plates and the engine plate; and the central engine plate defining a drive opening, and the side wall panel of each of the J-shaped plates defining a transmission opening, the transmission openings being aligned with each other.

One object of the present invention is to provide an improved riding lawnmower transmission housing.

Related objects and advantages of the present invention will be apparent from the following description.

DESCRIPTION OF THE PREFERRED EMBODIMENT

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 2, 3 and 4, there is illustrated riding lawnmower 10 with a grass catcher 11 shown in phantom lines. Grass catcher 11 is suitably affixed to the back of lawnmower 10 and is pulled behind lawnmower 10. Lawnmower 10 includes seat 12, fuel tank 13, chassis 13a, drive wheel 14, front wheel 14a, drive wheel 15, and front wheel 15a. Front wheels are fastened to chassis 13a and are pivotally mounted to facilitate sharp turning of lawnmower 10. Seat 12 is a cushioned seat which is positioned above transmission housing 18 and rearward of fuel tank 13. Chassis 13a provides a frame structure to solidly integrate the various components of lawnmower 10.

Figure 1:
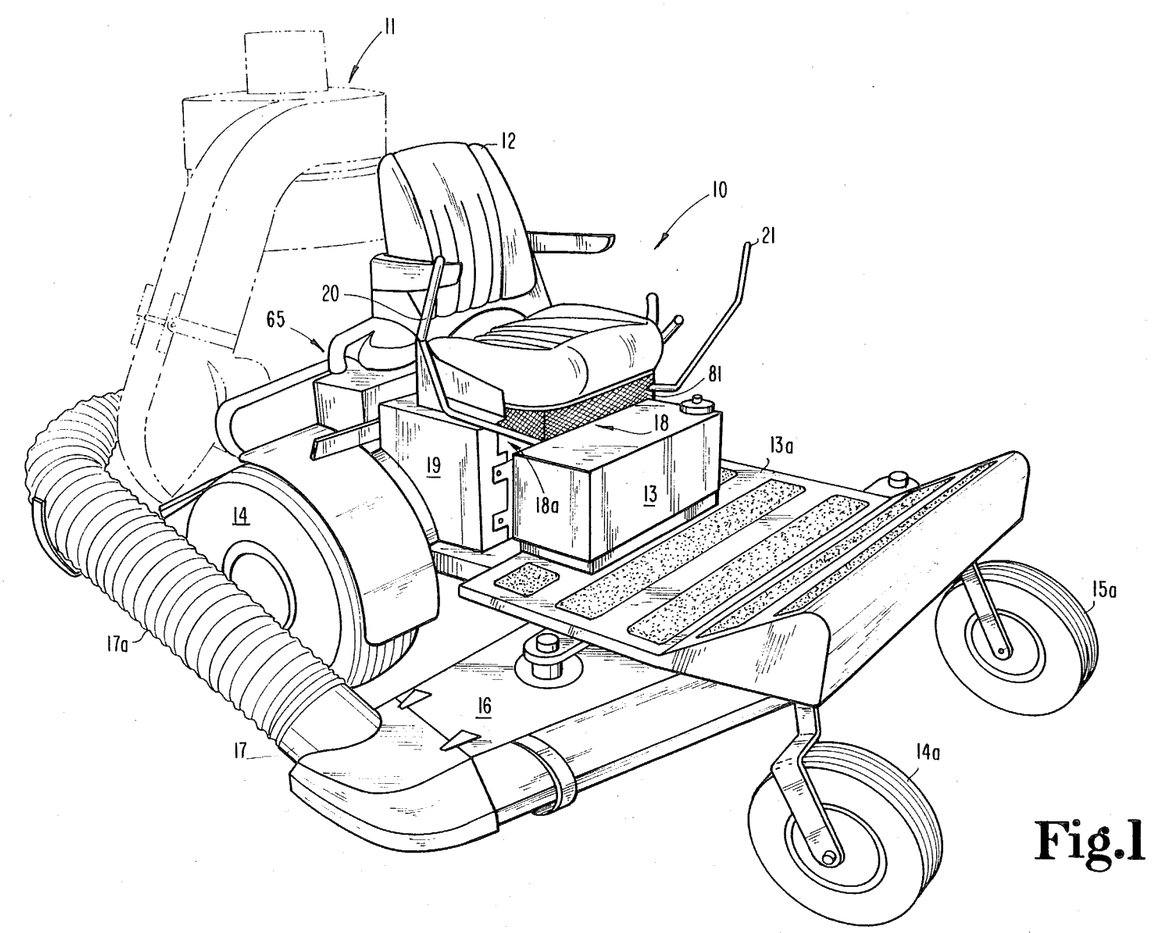
FIG. 1 is a side-front perspective view of a riding lawnmower including a transmission housing according to a typical embodiment of the present invention.

Grass is cut by rotating blades below the mower deck 16 and exhausted out of the clipping exhaust 17. Although grass clipping may be discharged to the atmosphere and across the lawn being cut, FIG. 1 illustrates an arrangement in which the clipping are directed through chute 17a back towards and into grass catcher 11.

Cover plate 19 is positioned outboard of transmission assembly 18a and inboard of drive wheel 14. Cover plate 19 provides a cover for parts of transmission assembly 18a.

Transmission housing 18 serves as a rigid housing in and on which various component parts of the transmission assembly 18a are mounted.

The speed and direction of travel of lawnmower 10 is controlled by control levers 20 and 21. Each of these control levers actuates hydrostatic transmissions 23a and 23b (FIG. 3) in the transmission housing 18. Both control levers and their connected transmission work independently of one another and provide both power and steering to drive wheels 14 and 15. Thus, for example, when control lever 20 is pushed forward, the transmission causes drive wheel 14 to rotate in a forward manner, turning the lawnmower to the left. A left-hand turn of lawnmower 10 may be made by pushing control lever 20 forward while holding control lever 21 in a neutral position. Pushing both control levers 20 and 21 forward causes lawnmower 10 to move forward. Similarly, lawnmower 10 may be put in reverse motion by pulling both control levers backwards. The speed which the drive wheels rotate is proportional to the distance the control levers are pushed forward or pulled backwards.

Figure 2:
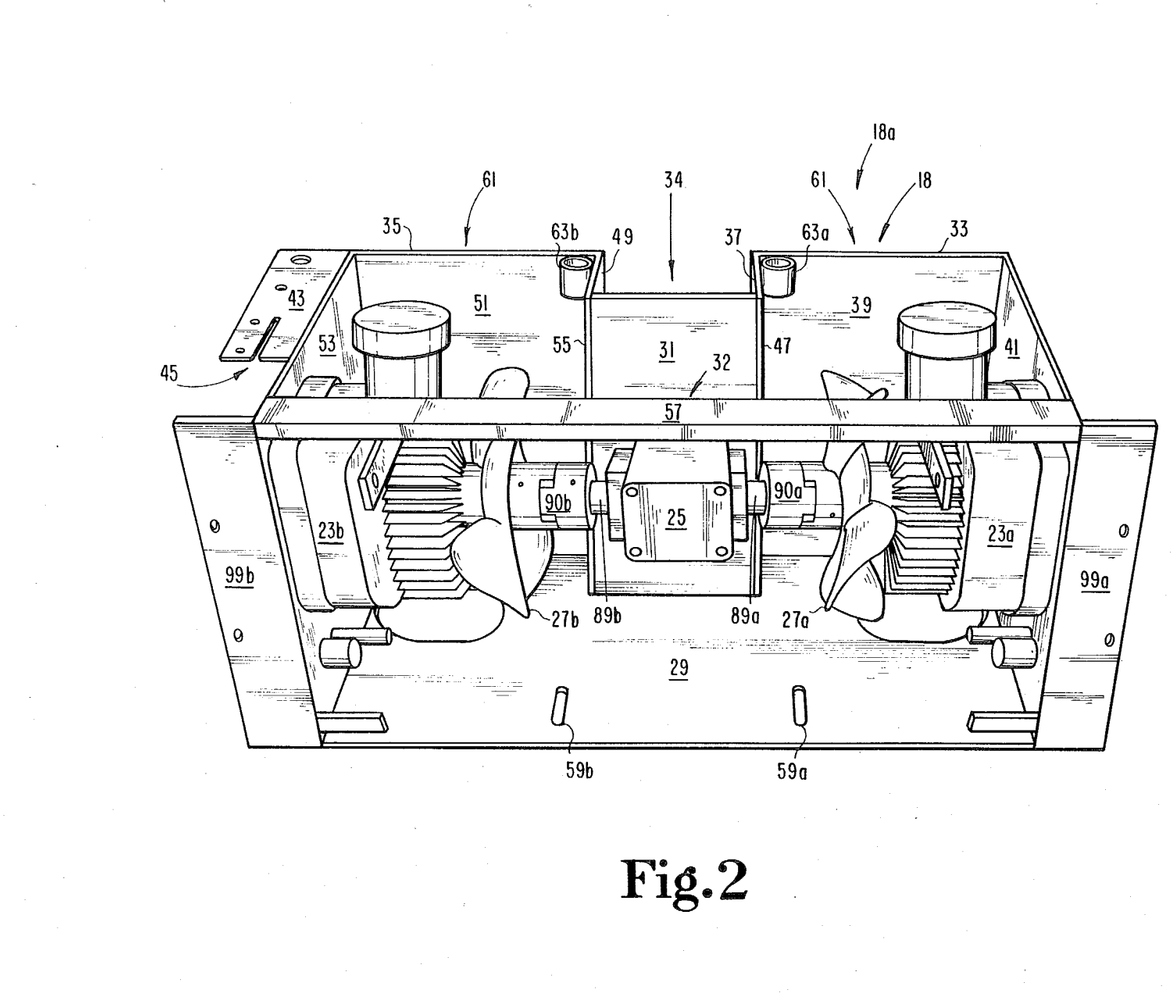
FIG. 2 is a front-top perspective view of the FIG. 1 transmission housing.
Figure 3:
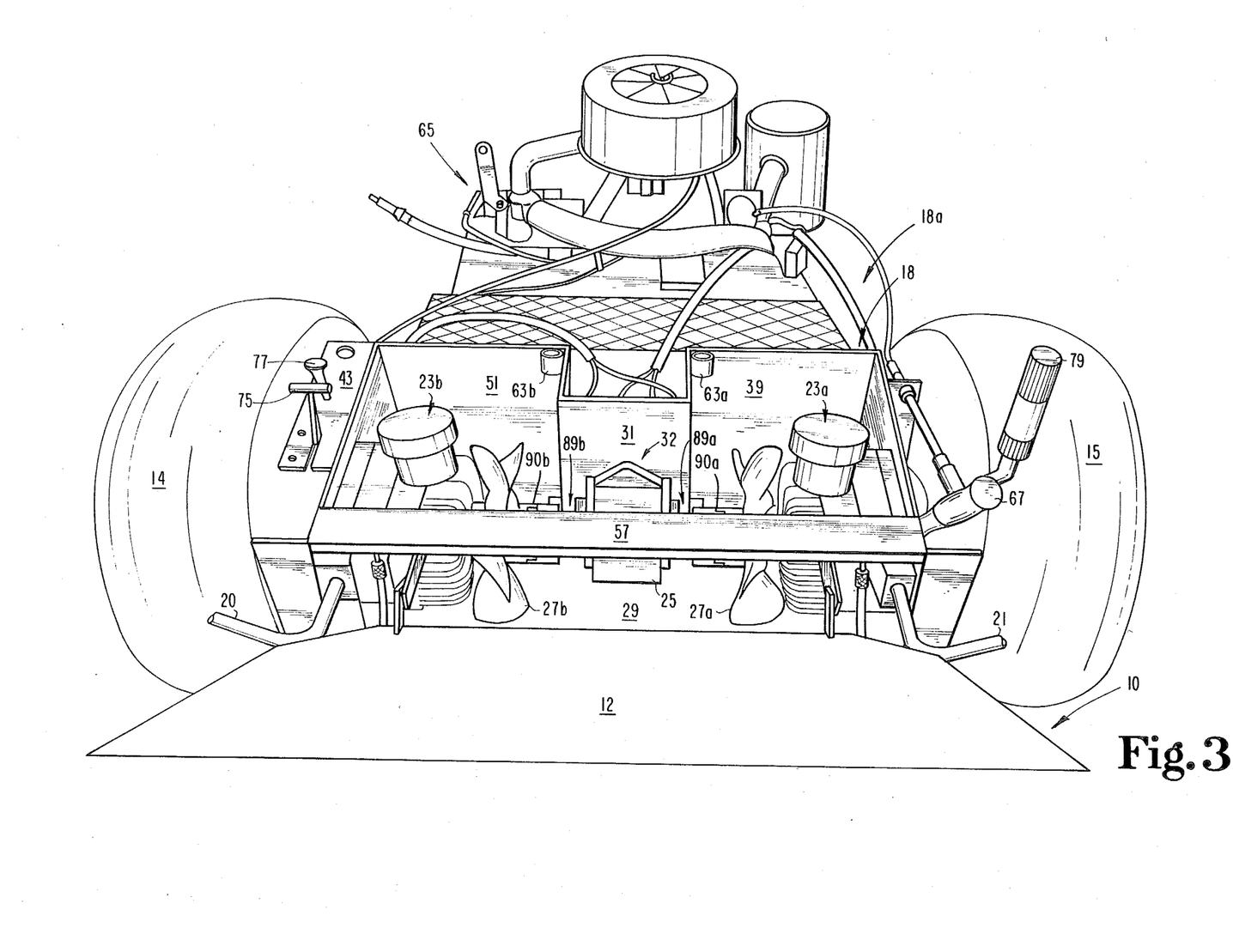
FIG. 3 is a front-top perspective view of the FIG. 1 transmission housing positioned in a riding lawnmower.

Referring now to FIGS. 2 and 3, transmission housing 18 which houses hydrostatic transmission 23a and hydrostatic transmission 23b is shown in greater detail. The hydrostatic transmissions operate to couple rotary drive power from engine 65 to the drive wheels. The hydrostatic transmissions act as torque converters, reducing the rotary speed delivered from the engine while increasing the torque delivered to the drive wheels. These transmissions are engaged and disengaged by movement of control levers 20 and 21. A suitable hydrostatic transmission for the present invention is a hydrostatic transmission, Eaton, Part No. 700-000. Likewise, hydrostatic transmission 23b is suitably an Eaton Part No. 700-001, having a reverse orientation from Part No. 700-000 for use on opposite sides of a transmission housing. Eaton hydrostatic transmissions are offered by Eaton Corporation of Spencer, Iowa.

Transmission housing 18 further houses T-gear box 25 which redirects rotary motion from single drive shaft 32 (See FIG. 2, hidden behind T-gear box 25) to two transmission axles 89a, 89b which are perpendicular to the drive axle. A suitable T-gear box for the present invention is Peerless Part No. P91, Model No. 1000-010 offered by Peerless Gear and Machine Division of Tecumseh in Clinton, Mich. The T-gear box is coupled to the hydrostatic transmissions by transmission axles 89a and 89b (See FIG. 2). The concentric center of these axles form a transmission axis 92 (See FIG. 7). These transmission axles traverse the width of the transmission housing 18. The transmission axles include axle couplers 90a and 90b which have rubberized elements to help reduce torsional impact shock in the transmission axles and to accommodate slight misalignment of the hydrostatic transmissions or T-gear box. Hydrostatic transmissions 23a and 23b include cooling fans 27a and 27b to improve cooling air ventilation.

Transmission housing 18 is made up of floor 29, central engine plate 31, J-shaped folded plate 33 and J-shaped folded plate 35. J-shaped folded plate 33 includes inner flange 37, engine portion 39 and side wall 41. Inner flange 37, engine portion 39 and side wall 41 are all panel portions of J-shaped plate 33 and are all formed from a unitary or homogeneous piece of sheet steel which has been folded to collectively define J-shaped folded plate 33. J-shaped folded plate 33 is welded to central engine plate 31 along weld seam 47.

J-shaped folded plate 35 is made up of inner flange 49, engine portion 51 and side wall 53. Thus, inner flange 49, engine portion 51 and side wall 53 are all panel portions of J-shaped plate 35 and collectively form J-shaped folded plate 35. J-shaped folded plate 35 is a unitary or homogeneous sheet of steel folded symmetric to J-shaped folded plate 33 and is positioned opposite to J-shaped folded plate 33 to partially define the geometry of transmission housing 18. In the preferred embodiment, these folds are at 90 degree angles forming a box-like transmission housing 18. J-shaped folded plate 35 is welded to central engine plate 31 along weld seam 55. J-shaped folded plate 35 also includes throttle plate 43 having throttle slot 45, providing a mount for throttle lever 75 and choke 77 as seen in FIG. 3.

Inner flanges 37 and 49 and central engine plate 31 collectively define an engine recess 34 which protrudes inwardly of the housing and inwardly of engine wall 61. The engine recess forms an indentation which facilitates positioning of the hydrostatic transmissions proximate to the lawnmower engine.

Rigidity brace 57 is welded to side wall 41 and side wall 53, adding structural strength to transmission housing 18 and providing support for seat 12.

Floor 29 is welded to side walls 41 and 53, engine portions 39 and 51, central engine plate 31, and flanges 37 and 49. Thus, transmission housing 18 is primarily defined by four pieces welded together to form a box-like shape having an open top and open front. Additionally, rigidity brace 57 makes transmission housing 18 more rigid. The transmission housing 18 is manufactured with tight adherence to design specifications.

Floor 29 includes slot 59a and slot 59b (FIG. 2). Slots 59a and 59b are longitudinal holes cut in floor 29, providing an aperture through which transmission housing 18 may be bolted to the chassis of the riding lawnmower. When in operation, the riding lawnmower has an engine (not shown in FIG. 2) located behind central engine plate 31. The engine delivers rotary power to T-gear box 25 by way of drive shaft 32. The T-gear box in turn perpendicularly translates the rotary power to hydrostatic transmissions 23a and 23b by way of transmission axles 89a and 89b. In turn, hydrostatic transmissions 23a and 23b transmit the rotary power to the rear drive wheels 14 and 15 (not shown in FIG. 2).

Engine portion 51, flange 49, central engine plate 31, flange 37, and engine portion 39 collectively define an engine wall 61. Engine wall 61 forms a barrier between hydrostatic transmissions 23a and 23b and engine 65 of the riding lawnmower. Engine wall 61, as well as the rest of transmission housing 18, comprises thin sheet steel. Thus, engine wall 61 provides a thermal barrier, impeding heat transfer from the hydrostatic transmissions to the engine and/or from the engine to the hydrostatic transmissions. In an alternative embodiment, not shown, engine wall 61 consists of a unitary sheet of metal, rather than an assembly of a plurality of parts such as engine portion 51, flange 49, central engine plate 31, flange 37, and engine portion 39.

Transmission housing 18 further includes bearing rings 63a and 63b which are steel rings welded in their respective cusps formed by the engine portion and the flange of their respective J-shaped folded plates. Bearing rings 63a and 63b function to house springs (not shown) which help to support seat 12.

Referring now to FIG. 3, FIG. 3 illustrates transmission housing 18 positioned in lawnmower 10, between drive wheel 14 and drive wheel 15 and in front of engine 65. Parking brake lever 67 actuates a braking mechanism in both hydrostatic transmissions 23a and 23b. Parking brake lever 67 effects this braking mechanism on hydrostatic transmission 23b by way of a transmission brake rod 69 (not shown in FIG. 3) hidden behind rigidity brace 57. Seat 12 is in a folded forward position, revealing the interior of transmission housing 18. Although not shown in FIG. 3, engine 65 is mounted on an engine plate. The engine plate is cantileverly welded to the back of the transmission housing 18 such that the engine plate is behind floor 29. The engine plate has two slots longitudinally parallel with slots 59a and 59b of transmission housing 18. These slots in the engine plate (not shown) provide additional means to bolt the engine and transmission housing to the chassis of lawnmower 10. Throttle lever 75 and choke 77 are mounted in throttle plate 43. Blade engagement lever 79 allows the operator of the lawnmower to engage the mower blades below mower deck 16. Power from engine 65 is used to drive the mower blades. Note that FIG. 3 shows control levers 20 and 21 (partially cut off) coupled to hydrostatic transmissions 23b and 23a. In this way, drive wheel speed and direction are controlled by the operator directly through the independent hydrostatic transmissions, without having to adjust the engine speed.

Figure 4:
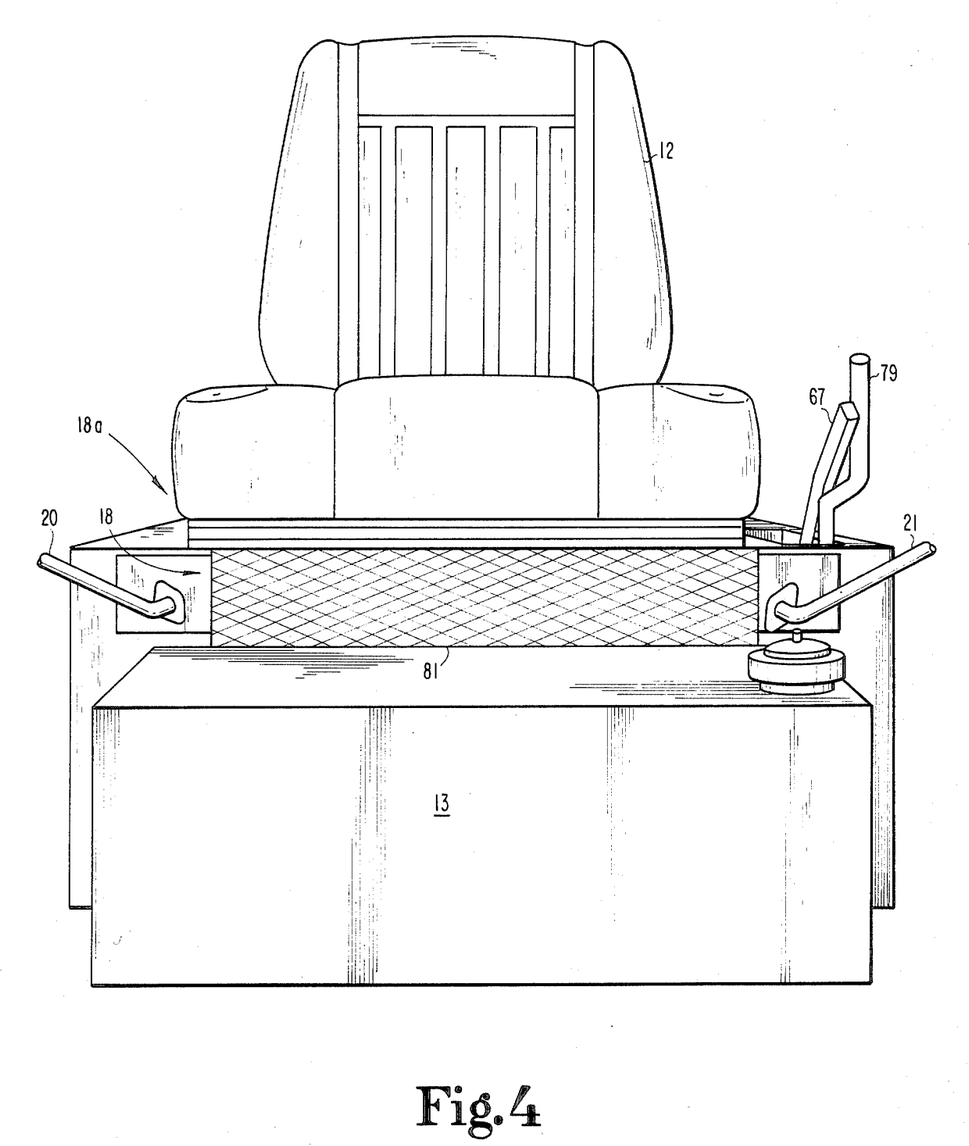
FIG. 4 is a front elevation view of the FIG. 1 transmission housing.

Referring now to FIG. 4, FIG. 4 illustrates the positional relationship of transmission housing 18 and seat 12. Screen 81 is affixed to transmission housing 18 along the front open side of the transmission housing 18, opposite of engine wall 61 (not shown). Screen 81 allows air ventilation for cooling of the hydrostatic transmissions housed in the transmission housing 18, while screening out large physical matter from entering the transmission housing 18. Seat 12 is fastened above and mounted to transmission housing 18.

Figure 5:
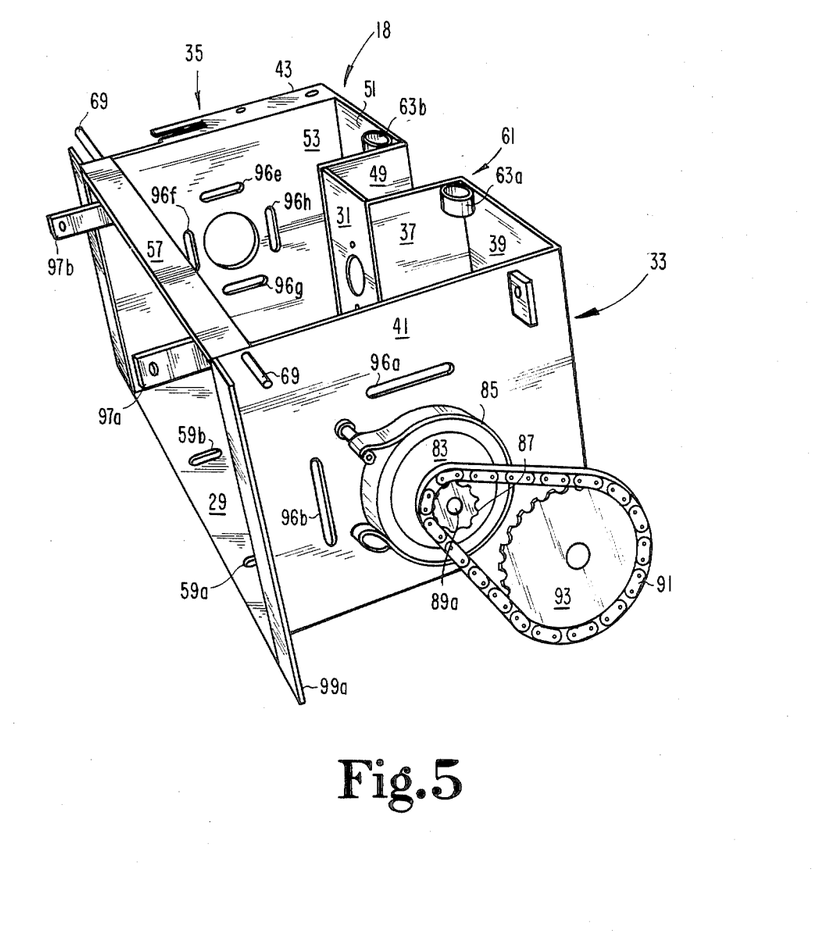
FIG. 5 is a side-top perspective view of the FIG. 1 transmission housing.

Referring now to the housing details of FIG. 5, it is noted that hydrostatic transmissions 23a and 23b are not shown for drawing clarity. Added is brake drum 83 which is surrounded by brake band 85. Sprocket 87 uses rotary motion transmitted from the hydrostatic transmission through the transmission axle 89a to drive chain 91. Chain 91 in turn drives sprocket 93. Sprocket 93 has a smaller sprocket 95 (not shown in FIG. 5) which is fastened to and concentric with sprocket 93. Sprocket 95 has a smaller diameter than sprocket 93 and is further used to deliver rotary drive power to drive wheel 15 (not shown). Side slots 96a and 96b provide cooling holes to allow air ventilation to prevent overheating of hydrostatic transmission 23a. Side slots 96c and 96d (not shown in FIG. 5) perform a similar function. Likewise, side slots 96e, 96f, 96g, and 96h perform similar functions in side wall 53. Seat mounting brackets 97a and 97b provide a bracket to mount seal 12 (not shown in FIG. 5) to transmission housing 18 so as to allow seat 12 to hingedly pivot forward of transmission housing 18.

Figure 6:
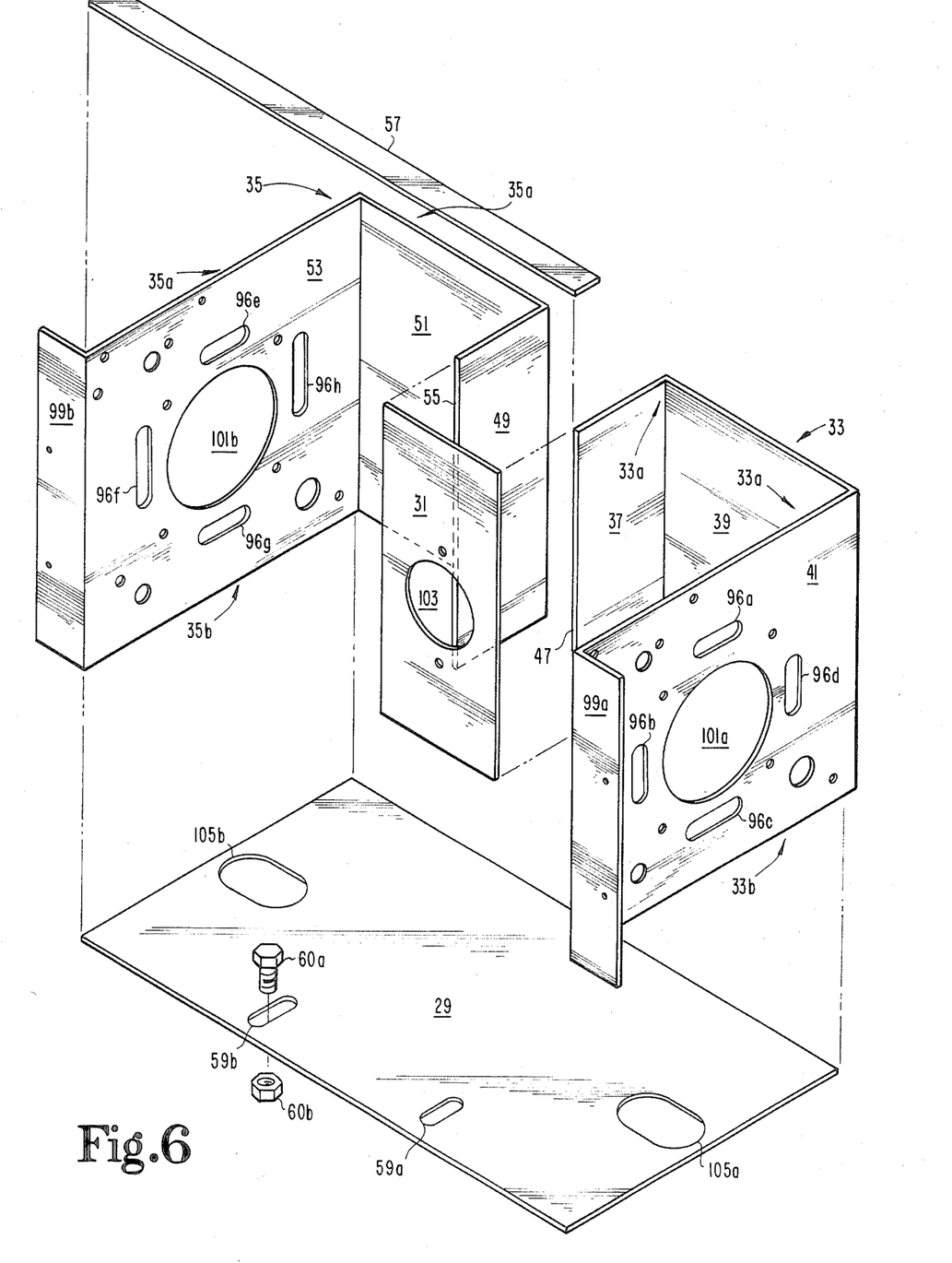
FIG. 6 is an exploded perspective view of the FIG. 1 transmission housing.

Referring now to FIG. 6, which is an exploded perspective view, the major sheet metal parts of transmission housing 18 are shown. Also included is rigidity brace 57. The four major parts of transmission housing 18 are the floor 29, the central engine plate 31, J-shaped folded plate 33, and J-shaped folded plate 35 which collectively account for more than 90% of the weight of the transmission housing. As discussed above, the two J-shaped plates include a flange, an engine portion, and a side wall which collectively form a "J-shape" when viewed from a top plan view. Note that J-shaped folded plate 33 and J-shaped folded plate 35 also include front flange 99a and 99b, respectively. Side wall 41 has a transmission opening 101a cut in it. Similarly, side wall 53 has transmission opening 101b cut in it. Rotary power from the hydrostatic transmissions is delivered to a sprocket such as sprocket 87 by way of an axle such as transmission axle 89a (not shown in FIG. 6) through a transmission opening such as transmission opening 101a.

Drive opening 103 is cut in central engine plate 31 and provides an opening through which rotary power may be delivered from the engine 65 to drive shaft 32 and in turn to T-gear box 25 (not shown in FIG. 6). Transmission service holes 105a and 105b provide openings through which the hydrostatic transmissions may be drained or otherwise serviced. The service holes also provide holes through which cooling air may flow through transmission housing 18 so as to cool the hydrostatic transmissions mounted therein. Various other holes are cut in the elements of transmission housing 18 to provide means for mounting the hydrostatic transmissions, the T-gear box, and other elements to be mounted to the transmission housing. Typically, the transmission housing is made up of sheet steel, the sheet being less than ¼ inch in thickness. The various holes and openings in the transmission housing are preferably fabricated by laser cutting techniques. The welds in the transmission housing such as at weld seam 47 (FIG. 2) are ordinary steel welds.

Each of the J-shaped folded plates has a top edge 33a and 35a and a bottom edge 33b and 35b. These edges define the upper and lower edges of the J-shaped plates and are the portion of the J-shaped plates which are "J" shaped when viewed from a top plan view. The side portions, engine portions, and inner flange portions of the J-shaped plates are each panels located between the top and bottom edges.

Figure 7:
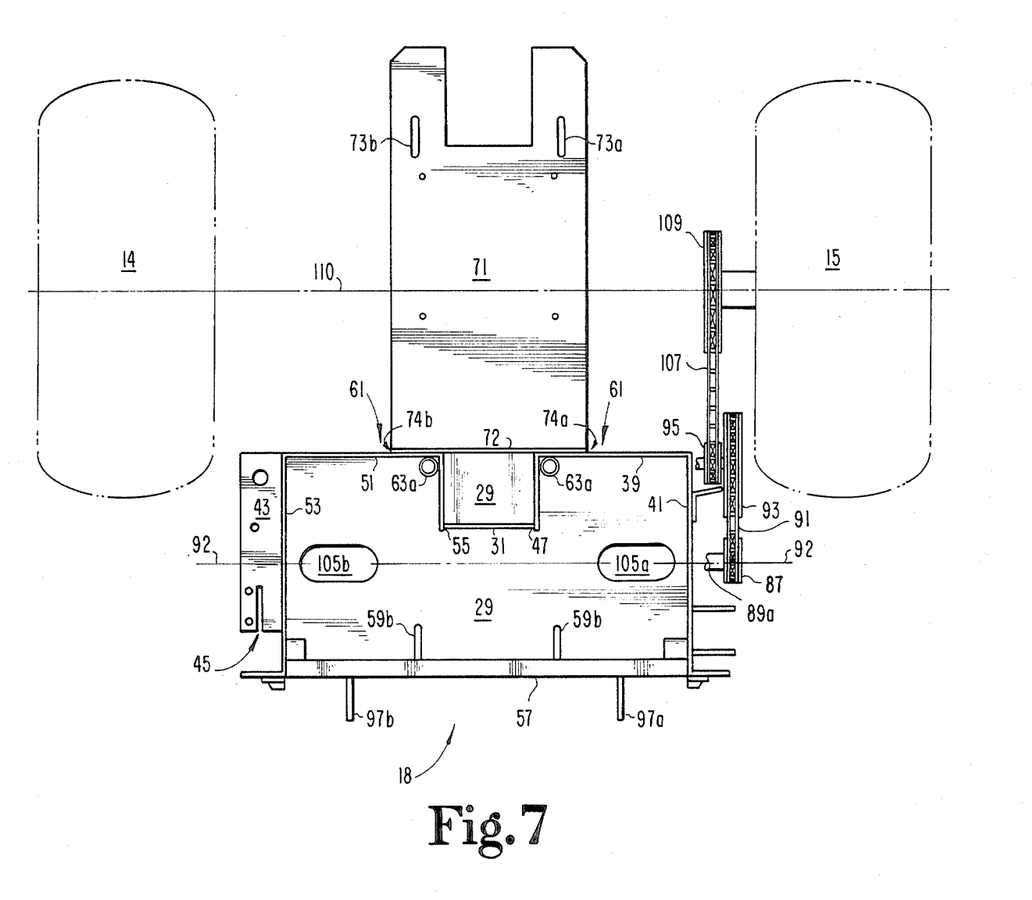
FIG. 7 is a top plan view of the FIG. 1 transmission housing.

Referring now to FIG. 7, which is a top view of one embodiment of the housing of the present invention, drive wheels 14 and 15 are shown in phantom lines to illustrate the relative position to the rear of the transmission housing 18. Axis of rotation 110 is the axis which the drive wheels rotate around and the axis is parallel with transmission axis 92 which passes through aligned transmission openings 101a and 101b.

Note that rotary power from transmission axle 89a is transmitted through sprocket 87 into chain 91 and then to sprocket 93. Sprocket 95 further delivers the power through chain 107 to sprocket 109, which in turn delivers the rotary power to drive wheel 15. A similar drive train (not shown) operates on the opposite side of the transmission housing 18 to provide drive power to drive wheel 14.

Engine plate 71 is welded both to engine portion 39 and engine portion 51 along upward folded engine plate flange 72 at welds 74a and 74b. The engine plate is in a plane which is parallel to floor 29 and about one inch below floor 29. Engine plate 71 provides a surface upon which engine 65 (not shown for drawing clarity) is mounted. Engine slots 73a and 73b along with slots 59a and 59b provide openings through which threaded fasteners such as bolt 60a and nut 60b (FIG. 6) may be used to attach the transmission housing 18 and engine plate 71 collectively to the chassis of the lawnmower 10. Typically, bolt 60a and nut 60a make up a standard threaded ⅜ inch diameter shank fastener and are made of steel. Since the slots are longitudinal slots rather than round holes, bolt assembly 60a, 60b may be loosened, allowing the engine-transmission assembly 65, 71, 18a to be slidably moved forward or backward. The slots are perpendicular to transmission axis 92 and axis of rotation 110. This allows the relative distance between transmission axis 92 and axis of rotation 110 to be lengthened or shortened, which allows for slackening or tightening in chain 91 and chain 107. The slackening or tightening in the chains in the sprocket drive mechanism facilitates changing or repairing or tightening or loosening the drive chains. Conversely, the bolt assemblies in slots 73a and 73b and slots 59a and 59b may be tightened to securely fasten transmission housing 18 and engine plate 71 to the chassis of the lawnmower 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An improved housing for a riding lawnmower transmission comprises:
   a pair of J-shaped folded plates, each including a side wall panel, an engine panel and an inner flange panel;
   a central engine plate disposed between said pair of J-shaped plates and rigidly attached to said J-shaped plates;
   a floor plate disposed beneath said pair of J-shaped plates and said engine plate; and
   said central engine plate defining a drive opening, and the side wall panel of each of said J-shaped plates defining a transmission opening, said transmission openings being aligned with each other.

2. A housing as claimed in claim 1 wherein said engine panels and said inner flange panels of said J-shaped plates and said central engine plate collectively define an engine wall.

3. A housing as claimed in claim 2 and further comprising:
   an engine recess located in said engine wall and defined by said central engine plate and said inner flange panels, wherein said engine recess protrudes inward of the housing; and
   a rigidity brace fastened to each of said side panels.

4. The housing of claim 3 and further comprising;
   a plurality of slotted holes located in said floor and being aligned parallel to one another; and
   bolt means located in said slotted holes and being tightenable to secure said floor to the chassis of the riding lawnmower and being loosenable to allow movement of said floor relative to the chassis of the riding lawnmower.

5. The housing of claim 4 wherein said side wall panels are each generally perpendicular to said floor and to said engine wall panels.

6. The housing of claim 5 and further comprising a lateral transmission axis wherein said side wall panels are parallel to each other; and wherein said lateral transmission axis is generally perpendicular to said side wall panels and to said slotted holes and passes through each of said transmission openings.

7. The housing of claim 6 and being assembled in combination with:
   a T-gear box mounted to said central engine plate; and
   a pair of hydrostatic transmissions mounted to said side wall panels.

8. The housing of claim 6 and being assembled in combination with a riding lawnmower fastened to said floor by said bolt means.

9. A housing as claimed in claim 1 wherein said engine wall is a unitary folded sheet of metal.

10. An improved transmission housing assembly for a riding lawnmower wherein the lawnmower engine and transmission are in close proximity to each other, said housing comprising:
    rigid box means for housing the transmission;
    an engine wall partially defining said rigid box means and located between the riding lawnmower engine and the riding lawnmower transmission, said engine wall being adapted for substantially impeding heat transfer between the riding lawnmower engine and the riding lawnmower transmission while the riding lawnmower is in operation;
    a floor partially defining said rigid box means;
    a first J-shaped folded plate;
    a second J-shaped folded plate; and
    a central engine plate, said first J-shaped folded plate further including a first engine panel, and a first inner flange, said second J-shaped folded plate further including a second engine panel, and a second inner flange, wherein said first J-shaped folded plate and said second J-shaped folded plate are rigidly connected to said floor and to said central engine plate, and wherein said first engine panel, said first inner flange, said central engine plate, said second inner flange, and said second engine panel collectively define said engine wall.

11. The housing of claim 10 and further comprising:
    a plurality of slotted holes located in said floor;
    bolt means located in said slotted holes and said slotted holes are aligned parallel to one another, wherein said bolt means are tightenable to secure said floor to the chassis of the riding lawnmower, and wherein said bolt means are loosenable to allow movement of said floor relative to the chassis of the riding lawnmower.

12. The housing of claim 11 and further comprising:
    a rigidity brace fastened to said first side wall panel and said second side wall panel;
    an engine recess located in and partially defining said engine wall, said central engine plate defining a drive opening.

13. The housing of claim 12 and being assembled in combination with a riding lawnmower fastened to said floor by said bolt means.

* * * * *